US007759449B2

(12) United States Patent
Nichols et al.

(10) Patent No.: US 7,759,449 B2
(45) Date of Patent: *Jul. 20, 2010

(54) METHODS FOR INTRODUCING ADDITIVES INTO POLYETHYLENE TEREPHTHALATE

(75) Inventors: Carl S. Nichols, Waxhaw, NC (US); Tony Clifford Moore, Charlotte, NC (US)

(73) Assignee: Wellman, Inc., Bay Saint Louis, MS (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/962,167

(22) Filed: Oct. 8, 2004

(65) Prior Publication Data

US 2005/0170175 A1 Aug. 4, 2005

Related U.S. Application Data

(63) Continuation-in-part of application No. 10/628,077, filed on Jul. 25, 2003, now Pat. No. 6,803,082, which is a continuation of application No. 09/738,150, filed on Dec. 15, 2000, now Pat. No. 6,599,596.

(51) Int. Cl.
C08G 63/62 (2006.01)
C08G 63/00 (2006.01)

(52) U.S. Cl. .............. 528/272; 264/176.1; 264/219; 428/36.3; 428/364; 524/115; 524/481; 525/437; 528/271; 528/286; 528/487; 528/491; 528/503

(58) Field of Classification Search ................ 528/272, 528/286, 487, 489, 491, 503, 271; 525/437; 524/481, 115; 428/36.3, 364; 264/176.1, 264/209.1, 219
See application file for complete search history.

(56) References Cited

U.S. PATENT DOCUMENTS

| 3,538,045 A | 11/1970 | Stewart et al. |
| 3,553,157 A | 1/1971 | Dijkstra et al. |
| 3,956,008 A | 5/1976 | Knepper et al. |
| 4,132,707 A | 1/1979 | Borman |
| 4,224,264 A | 9/1980 | Ort et al. |
| 4,312,960 A | 1/1982 | Ort et al. |
| 4,365,031 A | 12/1982 | Massey et al. |
| 4,374,949 A | 2/1983 | Massey et al. |
| 4,434,276 A | 2/1984 | Horlbeck et al. |
| 4,443,573 A | 4/1984 | Wells et al. |
| 4,595,715 A | 6/1986 | Kuze et al. |
| 4,643,925 A | 2/1987 | Smith et al. |
| 4,654,399 A | 3/1987 | Callander et al. |
| 4,778,858 A | 10/1988 | Ginnings |
| 4,786,673 A | 11/1988 | Morival et al. |
| 4,898,897 A | 2/1990 | Kiyohara et al. |
| 5,008,230 A | 4/1991 | Nichols |
| 5,240,980 A | 8/1993 | Danielson et al. |
| 5,262,471 A | 11/1993 | Akao |
| 5,288,784 A | 2/1994 | Minayoshi |
| 5,308,892 A | 5/1994 | Zickler et al. |
| 5,376,702 A | 12/1994 | Stibal et al. |
| 5,523,379 A | 6/1996 | Rosenquist |
| 5,574,078 A | 11/1996 | Elwakil |
| 5,656,700 A | 8/1997 | Kagi et al. |
| 5,712,362 A | 1/1998 | Scholl et al. |
| 5,807,963 A | 9/1998 | Rosenquist |
| 5,834,089 A | 11/1998 | Jones et al. |
| 5,874,517 A | 2/1999 | Huang et al. |
| 5,898,058 A | 4/1999 | Nichols et al. |
| 5,900,487 A | 5/1999 | Rosenquist |
| 5,919,872 A | 7/1999 | Tung et al. |
| 5,919,891 A | 7/1999 | Rosenquist |
| 5,922,828 A | 7/1999 | Schiraldi |
| 5,939,516 A | 8/1999 | Greaves et al. |
| 5,945,460 A | 8/1999 | Ekart et al. |
| 5,962,558 A | 10/1999 | Rosenquist |
| 5,976,450 A | 11/1999 | Mreijen |
| 6,048,922 A | 4/2000 | Brink et al. |
| 6,110,405 A | 8/2000 | King et al. |
| 6,121,351 A | 9/2000 | Weaver et al. |
| 6,150,454 A | 11/2000 | Wu et al. |
| 6,150,496 A | 11/2000 | Ilg et al. |
| 6,284,866 B1 | 9/2001 | Schiavone |

(Continued)

FOREIGN PATENT DOCUMENTS

CA 2236638 11/1998

(Continued)

OTHER PUBLICATIONS

Opposition Brief filed in the European Patent Office on Jun 23, 2004, by Eastman Chemical Co. against European Patent EP 0 900 247, which issued Sep. 24, 2003, to Wellman, Inc.

(Continued)

Primary Examiner—Terressa M Boykin
(74) Attorney, Agent, or Firm—Summa, Additon & Ashe, P.A.

(57) ABSTRACT

The invention is a method for the late introduction of additives into polyethylene terephthalate. The method employs a reactive carrier that functions as a delivery vehicle for one or more additives. The reactive carrier reacts with the polyethylene terephthalate, thereby binding the reactive carrier in the polyethylene terephthalate resin and preventing the emergence of the reactive carrier and additives from the polyethylene terephthalate during subsequent thermal processing.

42 Claims, 2 Drawing Sheets

U.S. PATENT DOCUMENTS

| | | |
|---|---|---|
| 6,294,254 B1 | 9/2001 | Nichols et al. |
| 6,335,422 B2 | 1/2002 | Schiavone |
| 6,339,121 B1 | 1/2002 | Rafailovich et al. |
| 6,383,635 B1 | 5/2002 | King et al. |
| 6,423,764 B1 | 7/2002 | Zhao et al. |
| 6,485,829 B2 | 11/2002 | Nichols et al. |
| 6,500,890 B2 | 12/2002 | Edwards et al. |
| 6,559,271 B2 | 5/2003 | Schaaf et al. |
| 6,569,991 B2 | 5/2003 | Nichols et al. |
| 6,573,359 B2 | 6/2003 | Nichols et al. |
| 6,590,069 B2 | 7/2003 | Nichols et al. |
| 6,599,596 B2 | 7/2003 | Nichols et al. |
| 6,710,158 B2 | 3/2004 | Edwards et al. |
| 6,727,306 B2 | 4/2004 | Edwards et al. |
| 6,767,485 B1 | 7/2004 | Steiner |
| 6,803,082 B2 | 10/2004 | Nichols et al. |
| 7,294,671 B2 | 11/2007 | Bheda et al. |
| 2001/0029281 A1 | 10/2001 | Nichols et al. |
| 2002/0077449 A1* | 6/2002 | Nichols et al. .............. 528/272 |
| 2003/0022989 A1 | 1/2003 | Braig et al. |
| 2004/0236066 A1 | 11/2004 | Moore et al. |
| 2005/0170175 A1 | 8/2005 | Nichols et al. |
| 2005/0176881 A1 | 8/2005 | Bheda et al. |
| 2007/0142537 A1 | 6/2007 | Edwards et al. |
| 2008/0226856 A1 | 9/2008 | Edwards et al. |

FOREIGN PATENT DOCUMENTS

| | | |
|---|---|---|
| CZ | 177211 B1 | 2/1979 |
| EP | 0139203 | 5/1985 |
| EP | 169085 * | 1/1986 |
| EP | 0169085 A1 | 1/1986 |
| EP | 0266754 | 5/1988 |
| EP | 0272417 A2 | 6/1988 |
| EP | 0453917 A1 | 4/1991 |
| EP | 0455370 A2 | 11/1991 |
| EP | 0703263 * | 8/1995 |
| EP | 678376 A1 | 10/1995 |
| EP | 0703263 A1 | 3/1996 |
| EP | 718341 * | 6/1996 |
| EP | 0718341 A2 | 6/1996 |
| EP | 0794222 | 9/1997 |
| EP | 878502 A2 | 11/1998 |
| EP | 1349884 | 8/2004 |
| EP | 1341836 | 3/2005 |
| JP | 48-79896 | 10/1973 |
| JP | 61-250034 | 11/1986 |
| JP | 339348 * | 2/1991 |
| JP | 03039348 A | 2/1991 |
| JP | 04180957 | 6/1992 |
| JP | 05-117379 | 5/1993 |
| JP | 06-073205 | 3/1994 |
| JP | 6-73205 | 3/1994 |
| JP | 8-120066 | 5/1996 |
| JP | 8120066 * | 5/1996 |
| JP | 08120066 A | 5/1996 |
| JP | 11323126 * | 11/1999 |
| JP | 11323126 A | 11/1999 |
| WO | WO 88/01503 | 3/1988 |
| WO | WO 93/20147 | 10/1993 |
| WO | WO 99/28408 | 6/1999 |
| WO | WO 99/41297 * | 8/1999 |
| WO | WO 99/41297 A | 8/1999 |
| WO | WO 00/12793 A | 3/2000 |
| WO | WO 00/66659 A | 11/2000 |
| WO | WO 02/16464 A2 | 2/2002 |
| WO | WO 02/48237 | 6/2002 |
| WO | WO 02/051616 | 7/2002 |
| WO | WO 02/051616 A2 | 7/2002 |

OTHER PUBLICATIONS

G.M. Terekhova, N.V. Mikhailov, L.G. Tokareva; Heat Stability of Polyethylene Terephthalate (PET) Containing Phosphoric Acid Esters; Khimicheskie Volokna, No. 4, 1964, pp. 33-35.

Responsive comments filed in the European Patent Office on May 5, 2006, by Eastman Chemical Co. against European Patent EP 1 349 884, which issued Aug. 25, 2004, to Wellman, Inc.

English Translation of Opposition Brief filed in the EPO by Ciba Specialty Chemical on Dec. 8, 2005 against European Patent No. 1341836 (see sited earlier No. 81).

Wellman's Observation on Behalf of the Patentee in the Matter of European Patent No. 1349884 and in the matter of Opposition thereto by Eastman and by Ciba Spec. Chemical.

English translation of an official letter received from the Mexican Institute of Industrial Property, related to a Mexican Patent Application No. PA/a/2003/005346.

Opposition Brief filed in the European Patent Office by Ciba Speciality Chemical on Dec. 8, 2005 against European Patent No. 1341836.

Opposition Brief filed in the European Patent Office in European Patent Office By Eastman Chemical Co. on Dec. 8, 2005 against European Patent No. 1341836.

Opposition Brief filed in the European Patent Office by Ciba Speciality Chemical on May 23, 2005 against European Patent No. 1349884. (English translation is included).

Opposition Brief filed in the European Patent Office by Eastman Chemical Co. on May 25, 2005 against European Patent No. 1349884.

Ciba Specialty Chemicals Inc., Ciba® TINUVIN® 213 Liquid Benzotriazole UV Absorber, Printing date Oct. 2004.

Observations on Behalf of the Patentee filed on Dec. 6, 2004 in support of European Patent No. 0 900 247. (See Cite No. 71).

Wellman's Observations on Behalf of the Patentee in the Matter of European Patent No. 1341836 and in the Matter of Opposition thereto by Eastman and by Ciba Spec. Chemical; filed Jul. 24, 2006.

International Search Report (mailed Jun. 6, 2002), Written Opinion (mailed Sep. 10, 2002), Written Opinion (mailed Mar. 10, 2003), and International Preliminary Examination Report (mailed Apr. 14, 2003) for International Application No. PCT/US 01/48423.

International Search Report (mailed Jun. 14, 2002), Written Opinion (mailed Aug. 7, 2002), Written Opinion (mailed Mar. 10, 2003), International Preliminary Examination Report (mailed Apr. 30, 2003), and International Preliminary Examination Report (mailed Jun. 16, 2003) for International Application No. PCT/US 01/48440.

Opposition Brief filed in the European Patent Office by Ciba Speciality Chemical on Dec. 8, 2005 against European Patent No. 1341836 (English translation of Cite No. 81).

Ciba-Geigy, Tinuvin 213, Ultraviolet Light Stabilizer, Product Data, Hawthorne NY (1990) (See also, Cite No. 85).

European Office Action for corresponding European Application No. 01992116, dated Jan. 9, 2004.

Wellman's Observations to the Oral Proceedings in the matter of European Patent No. 1349884, dated Sep. 7, 2007.

Decision revoking European Patent No. 1349884, issued by the European Patent Office on Nov. 20, 2007.

Minutes of the oral proceedings before the European Patent Office (Opposition Division) for European Patent No. 1349884, dated Nov. 20, 2007.

Eastman Chemical Company Observations to the Oral Proceedings in the matter of European Patent No. 1341836, dated Nov. 29, 2007.

Wellman's Observations to the Oral Proceedings in the matter of European Patent No. 1341836, dated Nov. 29, 2007.

Canadian Office Action in Canadian Application No. 2,431,823, dated Jan. 10, 2008.

Canadian Office Action in corresponding Canadian Application No. 2,431,637, dated Jan. 11, 2008.

Notice of Appeal filed by Wellman against the decision to revoke European Patent No. 1349884, dated Jan. 28, 2008.

Minutes of oral proceedings before the European Patent Office (Opposition Division) for European Patent No. 1341836, dated Jan. 30, 2008.

Decision revoking European Patent No. 1341836, issued by the European Patent Office on Apr. 3, 2008.

Canadian Office Action in commonly owned copending Canadian Application No. 2431823, dated Jan. 10, 2008 Counterpart of International Publication No. WO 02/051616.

Canadian Office Action in corresponding Canadian Application No. 2431637, dated Jan. 11, 2008 Counterpart of International Publication No. Wo 02/048237.

English translation of Taiwanese Office Action in commonly owned copending Taiwanese Application No. 091112797 Counterpart of International Publication No. WO 02/051616.

BASF Corporation, Polyethylene Glycols, General Information, Printing date Oct. 17, 2002.

English translation of Taiwanese Office Action in commonly owned copending Taiwanese Application No. 090131091 Counterpart of International Publication No. WO 02/048237.

English translation of Taiwanese Office Action in commonly owned copending Taiwanese Application No. 091113492 Counterpart of U.S. Appl. No. 6,573,359.

European Office Action in corresponding European Patent No. 1341836, dated Jan. 9, 2004.

Decision to granting European Patent No. 1341836, issued by the European Patent Office on Aug. 20, 2004.

Minutes of oral proceedings before the European Patent Office (Opposition Division) for European Patent No. 1349884, dated Nov. 7, 2007.

Decision revoking European Patent No. 1349884, issued by the European Patent Office on Nov. 20, 2007.

Letter from opponent Ciba in European opposition proceedings (German language) against European Patent No. 1349884, dated Aug. 20, 2007.

Summons to Oral Proceedings in European opposition proceeding against European Patent No. 1349884, dated Sep. 7, 2007.

Summons to Oral Proceedings in European opposition proceeding against European Patent No. 1341836, dated Nov. 29, 2007.

Statement of Grounds for Appeal in counterpart European Patent Application No. 01992116, filed on Jul. 25, 2008.

Eastman Chemical Company's Reply to Wellman's Statement of Grounds for Appeal in the matter of European Patent No. 1341836, dated Feb. 23, 2009.

Ciba's Reply to Wellman's Statement of Grounds for Appeal in the matter of European Patent No. 1341836, dated Feb. 16, 2009.

Decision confirming revocation of European Patent No. 1349884 for failure to file a Statement of Grounds, dated Dec. 5, 2008.

Letter from opponent Eastman Chemical Co. in opposition proceedings against European Patent No. 1341836, dated Feb. 23, 2009.

Letter from opponent Ciba in opposition proceedings (German-language) against European Patent No. 1341836, dated Feb. 16, 2009 [All references previously cited].

Canadian Notice of Allowance in Canadian Patent Application No. 2,431,637, dated Jun. 19, 2009.

Wellman's Notice of Appeal against the decision of the Opposition Division revoking European Patent No. 1341836, dated May 30, 2008.

English translation of Taiwanese Office Action in commonly owned copending Taiwanese Application No. 091112797, Counterpart of International Publication No. WO 02/051616, transmitted to Applicants on Mar. 23, 2008 [Re-cited with date as requested by Examiner].

English translation of Taiwanese Office Action in commonly owned copending Taiwanese Application No. 090131091, Counterpart of International Publication No. WO 02/048237, transmitted to Applicants on Jan. 24, 2003 [Re-cited with date as requested by Examiner].

English translation of Taiwanese Office Action in commonly owned copending Taiwanese Application No. 091113492, Counterpart of U.S. Appl. No. 6,573,359, issued on Jul. 4, 2005 [Re-cited with date as requested by Examiner].

* cited by examiner

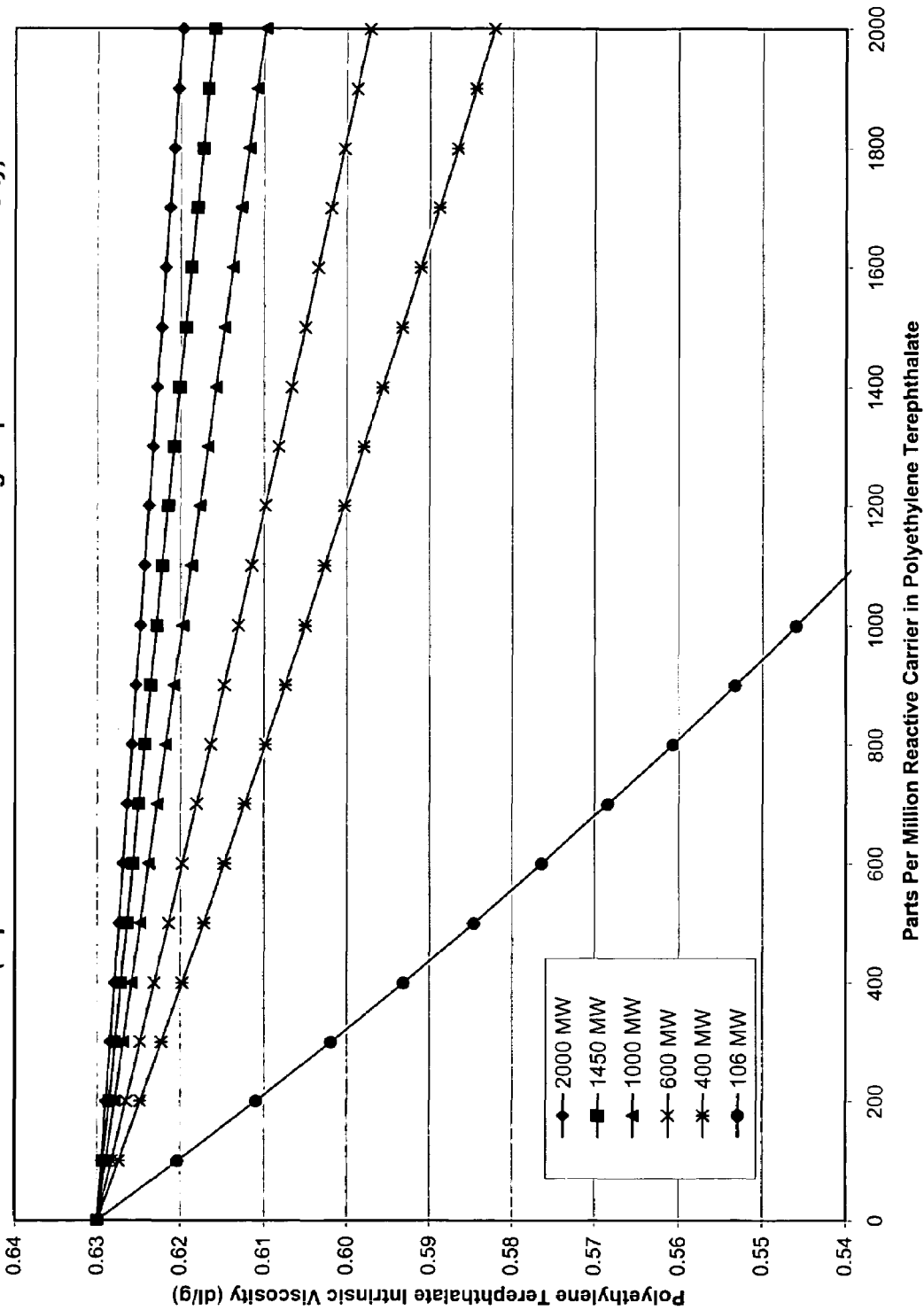

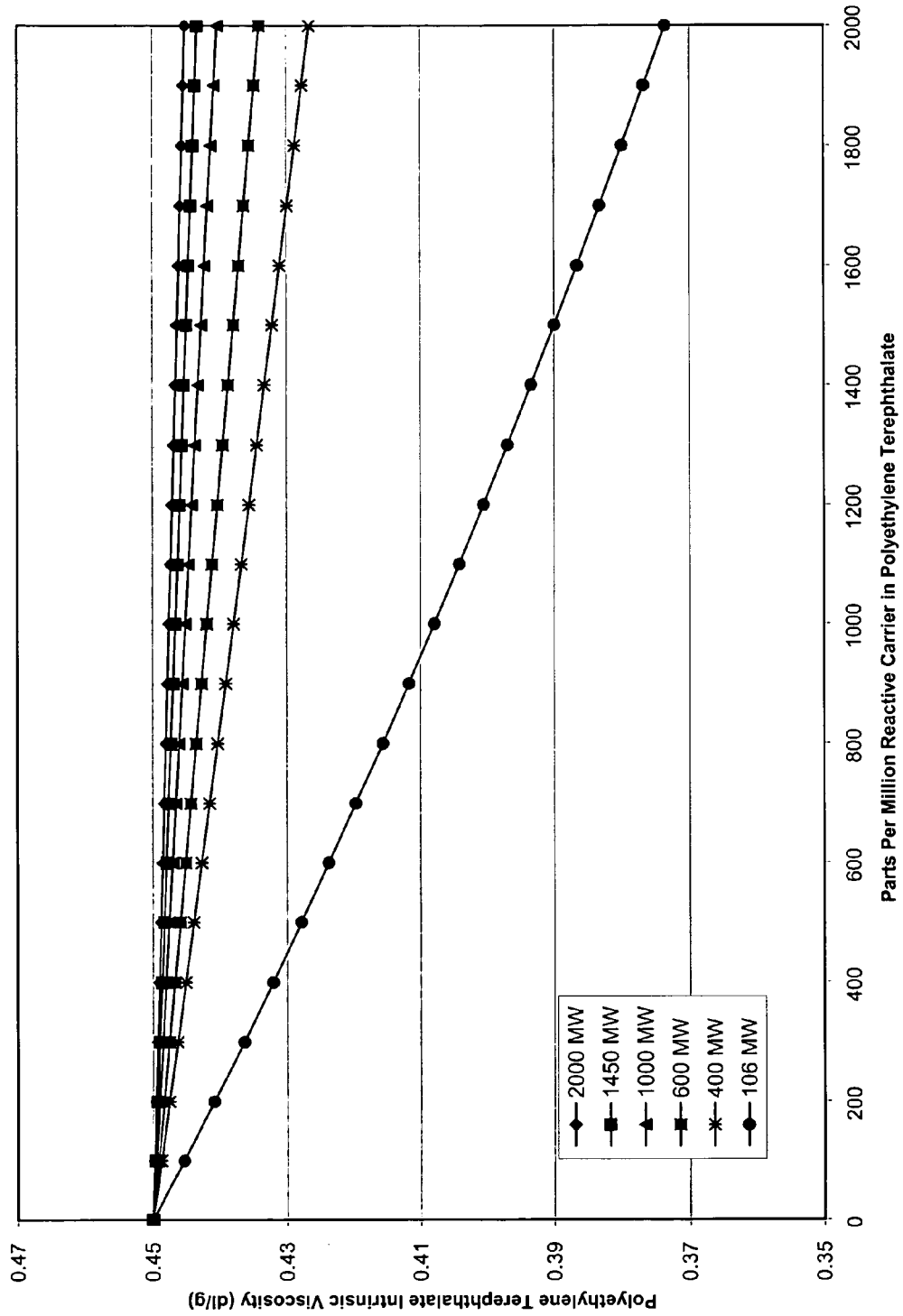

METHODS FOR INTRODUCING ADDITIVES INTO POLYETHYLENE TEREPHTHALATE

CROSS-REFERENCE TO RELATED PATENTS

This application is a continuation-in-part of commonly-assigned U.S. application Ser. No. 10/628,077, now U.S. Pat. No. 6,803,082, for Methods for the Late Introduction of Additives into Polyethylene Terephthalate, which was filed Jul. 25, 2003, and which itself is a continuation of commonly-assigned U.S. application Ser. No. 09/738,150, now U.S. Pat. No. 6,599,596, for Methods of Post-Polymerization Injection in Continuous Polyethylene Terephthalate Production, which was filed Dec. 15, 2000. Both U.S. Pat. No. 6,803,082 and U.S. Pat. No. 6,599,596 are herein incorporated by reference in their entirety.

This application, like its parent applications, incorporates entirely by reference commonly-assigned application Ser. No. 09/738,619, now U.S. Pat. No. 6,500,890, for Polyester Bottle Resins Having Reduced Frictional Properties and Methods for Making the Same.

This application further incorporates entirely by reference the following commonly-assigned patents and patent applications: Ser. No. 09/932,150, for Methods of Post-Polymerization Extruder Injection in Polyethylene Terephthalate Production, filed Aug. 17, 2001, now U.S. Pat. No. 6,569,991; Ser. No. 10/017,612, for Methods of Post-Polymerization Injection in Condensation Polymer Production, filed Dec. 14, 2001, now U.S. Pat. No. 6,573,359; Ser. No. 10/017,400, for Methods of Post-Polymerization Extruder Injection in Condensation Polymer Production, filed Dec. 14, 2001, now U.S. Pat. No. 6,590,069; Ser. No. 10/176,737 for Polymer Resins Having Reduced Frictional Properties, filed Jun. 21, 2002, now U.S. Pat. No. 6,727,306; Ser. No. 10/177,932 for Methods for Making Polyester Bottle Resins Having Reduced Frictional Properties, filed Jun. 21, 2002, now U.S. Pat. No. 6,710,158; U.S. patent application Ser. No. 10/850,269, for Methods of Making Titanium-Catalyzed Polyester Resins, filed May 20, 2004, and published Nov. 24, 2005, as U.S. Patent Application Publication No. 2005/0261462, now abandoned; and U.S. patent application Ser. No. 10/850,918, for Slow-Crystallizing Polyester Resins, filed May 21, 2004, now U.S. Pat. No. 7,129,317.

FIELD OF THE INVENTION

The present invention relates to the production of polyethylene terephthalate polyester. More particularly, the present invention relates to the late introduction of additives via reactive carriers during polyethylene terephthalate production.

BACKGROUND OF THE INVENTION

Because of their strength, heat resistance, and chemical resistance, polyester fibers and films are an integral component in numerous consumer products manufactured worldwide. Most commercial polyester used for polyester fibers and films is polyethylene terephthalate (PET) polyester. Because polyethylene terephthalate forms a lightweight and shatterproof product, another popular use for polyethylene terephthalate is as a resin for containers, especially beverage bottles.

Before 1965, the only feasible method of producing polyethylene terephthalate polyester was to use dimethyl terephthalate (DMT). In this technique, dimethyl terephthalate and ethylene glycol are reacted in a catalyzed ester interchange reaction to form bis(2-hydroxyethyl) terephthalate monomers, as well as a methanol byproduct that is continuously removed. These bis(2-hydroxyethyl)terephthalate monomers are then polymerized via polycondensation to produce polyethylene terephthalate polymers.

Purer forms of terephthalic acid (TA) are now increasingly available. Consequently, terephthalic acid has become an acceptable, if not preferred, alternative to dimethyl terephthalate as a starting material for the production of polyethylene terephthalate. In this alternative technique, terephthalic acid and ethylene glycol react in a generally uncatalyzed esterification reaction to yield low molecular weight monomers and oligomers, as well as a water byproduct that is continuously removed. As with the dimethyl terephthalate technique, the monomers and oligomers are subsequently polymerized by polycondensation to form polyethylene terephthalate polyester. The resulting polyethylene terephthalate polymer is substantially identical to the polyethylene terephthalate polymer resulting from dimethyl terephthalate, albeit with some end group differences.

Polyethylene terephthalate polyester may be produced in a batch process, where the product of the ester interchange or esterification reaction is formed in one vessel and then transferred to a second vessel for polymerization. Generally, the second vessel is agitated and the polymerization reaction is continued until the power used by the agitator reaches a level indicating that the polyester melt has achieved the desired intrinsic viscosity and, thus, the desired molecular weight. More commercially practicable, however, is to carry out the esterification or ester interchange reactions, and then the polymerization reaction as a continuous process. The continuous production of polyethylene terephthalate results in greater throughput, and so is more typical in large-scale manufacturing facilities.

When the polymerization process is complete, the resulting polymer melt is typically extruded and pelletized for convenient storage and transportation before being transformed into specific polyester articles (e.g., filament, films, or bottles). The latter kinds of steps are herein referred to as "polyester processing."

In both batch and continuous processes, a high activity catalyst is often employed to increase the rate of polymerization, thereby increasing the throughput of the resulting polyethylene terephthalate polyester. The high activity catalysts that are used in the polymerization of polyethylene terephthalate polyester can be basic, acidic, or neutral, and are often metal catalysts.

Primarily, the traditional polymerization catalysts used in the formation of polyethylene terephthalate from both terephthalic acid and dimethyl terephthalate contain antimony, most commonly antimony trioxide ($Sb_2O_3$). Although increasing production rates, polymerization catalysts like antimony trioxide will eventually begin to catalyze or encourage the degradation of the polyethylene terephthalate polymer. Such polymer degradation results in the formation of acetaldehyde, the discoloration (e.g., yellowing) of the polyethylene terephthalate polyester, and reduction of polymer molecular weight.

Furthermore, the recent availability of "hotter" catalysts that can significantly increase throughput has generated a corresponding need for better stabilization of the resulting polyester. U.S. Pat. No. 5,008,230 for a Catalyst for Preparing High Clarity, Colorless Polyethylene Terephthalate is exemplary of such an improved catalyst. To reduce the degradation and discoloration of polyethylene terephthalate polyester, stabilizing compounds are used to sequester ("cool") the catalyst, thereby reducing its effectiveness. The most commonly used stabilizers contain phosphorous, typically in the form of phosphates and phosphites. The phosphorous-containing stabilizers were first employed in batch processes to prevent degradation and discoloration of the polyethylene terephthalate polyester.

Although adding a stabilizer to the polymer melt in a batch reactor is a relatively simple process, numerous problems arise if the stabilizers are added in the continuous production of polyethylene terephthalate. For example, while early addition of the stabilizer prevents discoloration and degradation of the polyester, it also causes reduced production throughput (i.e., decreases polycondensation reaction rates). Moreover, such stabilizer is typically dissolved in ethylene glycol, the addition of which further slows the polymerization process. Consequently, early addition of the stabilizer in the polymerization process requires an undesirable choice between production throughput and thermal stability of the polymer. As used herein, "thermal stability" refers to a low rate of acetaldehyde generation, low discoloration, and retention of molecular weight following subsequent heat treatment or other processing.

Late addition of the stabilizer (e.g., after the polymerization process during polymer processing) may provide insufficient opportunity for the stabilizer to fully blend with the polymer. Consequently, the stabilizer may not prevent degradation and discoloration of the polyester. In addition, adding stabilizer during polymer processing is inconvenient and does not provide economies of scale.

U.S. Pat. No. 5,376,702 for a Process and Apparatus for the Direct and Continuous Modification of Polymer Melts discloses dividing a polymer melt stream into an unmodified stream and a branch stream that receives additives. In particular, a side stream takes a portion of the branch stream to an extruder, where additives are introduced. Such techniques, however, are not only complicated, but also costly, requiring a screw extruder and melt piping to process additives. Consequently, such arrangements are inconvenient and even impractical where total additive concentrations are low (e.g., less than one weight percent).

Certain problems associated with late addition of stabilizer are addressed in U.S. Pat. No. 5,898,058 for a Method of Post-Polymerization Stabilization of High Activity Catalysts in Continuous Polyethylene Terephthalate Production, which discloses a method of stabilizing high activity polymerization catalysts in continuous polyethylene terephthalate production. This patent, which is commonly assigned with this application, is hereby incorporated entirely herein by reference.

In particular, U.S. Pat. No. 5,898,058 discloses adding a stabilizer, which preferably contains phosphorous, at or after the end of the polymerization reaction and before polymer processing. This deactivates the polymerization catalyst and increases the throughput of the polyester without adversely affecting the thermal stability of the polyethylene terephthalate polyester. While a noteworthy improvement over conventional techniques, U.S. Pat. No. 5,898,058 teaches adding the stabilizer without a carrier. Consequently, the addition of solids into the polymer necessitates the costly use of an extruder.

Therefore, there is a need for a post-polymerization injection technique that ensures that the late addition of additives during continuous polyethylene terephthalate processes will yield a polyethylene terephthalate polymer whose additives and carriers are integral parts of the polymer resin.

OBJECT AND SUMMARY OF THE INVENTION

Accordingly, it is an object of the present invention to provide a method of adding additives via a reactive carrier to a continuous polyethylene terephthalate process after the melt-phase polycondensation reactions are essentially complete.

It is a further object of the present invention to provide a method of adding additives in a reactive carrier to a continuous polyethylene terephthalate process to reduce polymer transition times and eliminate upsets to the continuous process resulting from changing polymer formulations.

It is a further object of the present invention to provide a method of introducing additives into a continuous polyethylene terephthalate process in a way that reduces the degradation or volatilization of such additives.

It is a further object of the present invention to provide a simplified additive delivery system wherein the reactive carrier is a pumpable liquid or slurry at or near room temperature.

It is a further object of the present invention to provide a simplified additive delivery system that does not require the use of an extruder to deliver additives.

It is a further object of the present invention to provide a continuous process for the production of high quality polyethylene terephthalate polyester that improves upon the stabilizer-addition techniques disclosed by commonly-assigned U.S. Pat. No. 5,898,058.

The foregoing, as well as other objectives and advantages of the invention and the manner in which the same are accomplished, is further specified within the following detailed description and its accompanying drawings.

BRIEF DESCRIPTION OF THE DRAWING

FIG. 1 illustrates the theoretical loss of intrinsic viscosity of polyethylene terephthalate having an intrinsic viscosity of 0.63 dl/g as a function of the concentration of the reactive carrier at various molecular weights.

FIG. 2 illustrates the theoretical loss of intrinsic viscosity of polyethylene terephthalate having an intrinsic viscosity of 0.45 dl/g as a function of the concentration of the reactive carrier at various molecular weights.

DETAILED DESCRIPTION

The invention is a novel method for the late introduction of additives into a process for making polyethylene terephthalate. The additives are introduced during, and preferably after, the polycondensation of polyethylene terephthalate polymers. In particular, the method employs a reactive carrier that not only functions as a delivery vehicle for one or more additives, but also reacts with the polyethylene terephthalate, thereby binding the carrier in the polyethylene terephthalate resin. This prevents the emergence of the carrier from the polyethylene terephthalate during subsequent processing, such as solid state polymerization and injection molding operations. This also improves dispersion of the additive in the polymer and reduces the tendency of the additive to emerge and deposit in polymer processing equipment during solid state polymerization.

In one aspect, the present invention includes reacting a terephthalate component and a diol component to form polyethylene terephthalate precursors, e.g., bis(2-hydroxyethyl) terephthalate, which are then polymerized via melt phase polycondensation to form polymers of polyethylene terephthalate. During polycondensation, which is usually enhanced by catalysts, ethylene glycol is continuously removed to create favorable reaction kinetics. Thereafter, one or more additives are then introduced by way of a reactive carrier into the polyethylene terephthalate polymers (i.e., the reactive carrier functions as an additive delivery vehicle). The reactive carrier, which has a molecular weight of less than about 10,000 g/mol, not only facilitates uniform blending of the additives within the polymer melt, but also reacts with the polyethylene terephthalate polymers to ensure that the carrier does not emerge during subsequent processes.

In another aspect, the invention includes polymerizing the polyethylene terephthalate precursors via melt phase polycondensation to form polyethylene terephthalate polymers having a target intrinsic viscosity of at least about 0.45 dl/g. Once the polyethylene terephthalate polymers have achieved this target intrinsic viscosity, one or more additives are introduced by way of a reactive carrier having a molecular weight of less than about 10,000 g/mol. Finally, the melt phase polycondensation of the polyethylene terephthalate polymers is completed. Where additives are introduced during the polycondensation of polyethylene terephthalate polymers, the target intrinsic viscosity is preferably at least about 0.50 dl/g, more preferably at least about 0.55 dl/g, and most preferably at least about 0.60 dl/g. At an intrinsic viscosity of at least about 0.45 dl/g, the polyethylene terephthalate polymer possesses sufficient molecular weight, mechanical properties, melt strength, and crystallinity to facilitate polymer processing.

The embodiments of the present invention as herein disclosed are applicable regardless of whether the late addition of additives occurs after the polycondensation stage or during the polycondensation stage (i.e., where the target intrinsic viscosity of the polyethylene terephthalate polymers is at least about 0.45 dl/g).

As used herein, the term "intrinsic viscosity" is the ratio of the specific viscosity of a polymer solution of known concentration to the concentration of solute, extrapolated to zero concentration. Intrinsic viscosity, which is widely recognized as standard measurements of polymer characteristics, is directly proportional to average polymer molecular weight. See, e.g., *Dictionary of Fiber and Textile Technology*, Hoechst Celanese Corporation (1990); Tortora & Merkel, *Fairchild's Dictionary of Textiles* (7$^{th}$ Edition 1996).

Intrinsic viscosity can be measured and determined without undue experimentation by those of ordinary skill in this art. For the intrinsic viscosity values described herein, the intrinsic viscosity is determined by dissolving the copolyester in orthochlorophenol (OCP), measuring the relative viscosity of the solution using a Schott Autoviscometer (AVS Schott and AVS 500 Viscosystem), and then calculating the intrinsic viscosity based on the relative viscosity. See, e.g., *Dictionary of Fiber and Textile Technology* ("intrinsic viscosity").

In particular, a 0.6-gram sample (+/−0.005 g) of dried polymer sample is dissolved in about 50 ml (61.0-63.5 grams) of orthochlorophenol at a temperature of about 105° C. Fiber and yarn samples are typically cut into small pieces, whereas chip samples are ground. After cooling to room temperature, the solution is placed in the viscometer and the relative viscosity is measured. As noted, intrinsic viscosity is calculated from relative viscosity.

As used herein, the term "diol component" refers primarily to ethylene glycol, although other diols (e.g., low molecular weight polyethylene glycol) may be used as well. It will be understood by those of ordinary skill in the art that the diol component usually forms the majority of terminal ends of the polymer chains and so is present in the composition in slightly greater fractions. For example, the molar ratio of the terephthalate component and the diol component is typically between about 1.0:1.0 and 1.0:1.6.

As used herein, the term "terephthalate component" refers to diacids and diesters that can be used to prepare polyethylene terephthalate. In particular, the terephthalate component mostly includes terephthalic acid and dimethyl terephthalate, but can include diacid and diester comonomers as well. In this regard, those having ordinary skill in the art will know that there are two conventional methods for forming polyethylene terephthalate. These methods are well known to those skilled in the art.

One method employs a direct esterification reaction using terephthalic acid and excess ethylene glycol. In this technique, the aforementioned step of reacting a terephthalate component and a diol component includes reacting terephthalic acid and ethylene glycol in a heated esterification reaction to form monomers and oligomers of terephthalic acid and ethylene glycol, as well as a water byproduct. To enable the esterification reaction to go essentially to completion, the water must be continuously removed as it is formed.

The other method involves a two-step ester exchange reaction and polymerization using dimethyl terephthalate and excess ethylene glycol. In this technique, the aforementioned step of reacting a terephthalate component and a diol component includes reacting dimethyl terephthalate and ethylene glycol in a heated ester exchange reaction to form monomers of terephthalate and ethylene glycol, as well as methanol as a byproduct. To enable the ester exchange reaction to go essentially to completion, the methanol must be continuously removed as it is formed.

It will be understood by those having ordinary skill in the art that the polyethylene terephthalate herein described may be a modified polyethylene terephthalate to the extent the diol component includes other glycols besides ethylene glycol, such as diethylene glycol, 1,3-propanediol, 1,4-butanediol and 1,4-cyclohexane dimethanol, or the terephthalate component includes modifiers such as isophthalic acid, 2,6-naphthalene dicarboxylic acid, succinic acid, or one or more functional derivatives of terephthalic acid. In fact, most commercial polyethylene terephthalate polymers are modified polyethylene terephthalate polyesters.

In the present invention, the direct esterification reaction is preferred over the older, two-step ester exchange reaction. As noted, the direct esterification technique reacts terephthalic acid and ethylene glycol to form low molecular weight monomers, oligomers, and water.

For example, in a typical, exemplary process the continuous feed enters a direct esterification vessel that is operated at a temperature of between about 240° C. and 290° C. and at a pressure of between about 5 and 85 psia for between about one and five hours. The reaction, which is typically uncatalyzed, forms low molecular weight monomers, oligomers, and water. The water is removed as the esterification reaction proceeds and excess ethylene glycol is removed to provide favorable reaction kinetics.

Thereafter, the low molecular weight monomers and oligomers are polymerized via polycondensation to form polyethylene terephthalate polyester. This polycondensation stage generally employs a series of two or more vessels and is operated at a temperature of between about 250° C. and 305° C. for between about one and four hours. The polycondensation reaction usually begins in a first vessel called the low polymerizer. The low polymerizer is operated at a pressure range of between about 0 and 70 torr. The monomers and oligomers polycondense to form polyethylene terephthalate and ethylene glycol.

As noted previously, the ethylene glycol is removed from the polymer melt using an applied vacuum to drive the reaction to completion. In this regard, the polymer melt is typically agitated to promote the escape of the ethylene glycol from the polymer melt and to assist the highly viscous polymer melt in moving through the polymerization vessel.

As the polymer melt is fed into successive vessels, the molecular weight and thus the intrinsic viscosity of the polymer melt increases. The temperature of each vessel is generally increased and the pressure decreased to allow greater polymerization in each successive vessel.

The final vessel, generally called the "high polymerizer," is operated at a pressure of between about 0 and 40 torr. Like the low polymerizer, each of the polymerization vessels is connected to a flash vessel and each is typically agitated to facilitate the removal of ethylene glycol. The residence time in the polymerization vessels and the feed rate of the ethylene glycol and terephthalic acid into the continuous process is determined in part based on the target molecular weight of the polyethylene terephthalate polyester. Because the molecular weight can be readily determined based on the intrinsic viscosity of the polymer melt, the intrinsic viscosity of the polymer melt is generally used to determine the feed rate of the reactants and the residence time within the polymerization vessels.

Note that in addition to the formation of polyethylene terephthalate polymers, side reactions occur that produce undesirable by-products. For example, the esterification of ethylene glycol forms diethylene glycol (DEG), which is incorporated into the polymer chain. As is known to those of skill in the art, diethylene glycol lowers the softening point of the polymer. Moreover, cyclic oligomers (e.g., trimer and tetramers of terephthalic acid and ethylene glycol) may occur in minor amounts. The continued removal of ethylene glycol as it forms in the polycondensation reaction will generally reduce the formation of these by-products.

After the polymer melt exits the polycondensation stage, typically from the high polymerizer, it is generally filtered and extruded into polyester sheets, filaments, or pellets. Preferably, the polymer melt is extruded immediately after exiting the polycondensation stage. After extrusion, the polyethylene terephthalate is quenched, preferably by spraying with water or immersing in a water trough, to solidify it. The solidified polyethylene terephthalate polyester is cut into chips or pellets for storage and handling purposes. As used herein, the term "pellets" is used generally to refer to chips, pellets, and the like.

As will be known to those of skill in the art, the pellets formed from the polyethylene terephthalate polymers and the reactive carrier may be subjected to crystallization followed by solid state polymerization (SSP) to increase the molecular weight of the polyethylene terephthalate resin. It should be noted that the method of the invention does not adversely affect the SSP rate and often will even increase the SSP rate. The polyester chips are then re-melted and re-extruded to form items such as containers (e.g., beverage bottles), filaments, films, or other applications.

A particular advantage of the present invention is the reduction of polymer transition times and elimination of upsets to continuous processes that result from polymer formulation changes. As will be known by those familiar with the art, conventional polyester processing introduces additives in an ethylene glycol solution or slurry. These ethylene glycol streams are added into the esterification process or the first polycondensation vessel, each of which have a high ethylene glycol content. To effect a product change, the contents of each subsequent vessel must be completely replaced. In standard continuous units, the required transition time is on the order of four to eight hours.

The present invention improves upon the prior art by employing a reactive carrier rather than an inert carrier or no carrier at all. The reactive carrier should be introduced to the polyethylene terephthalate polymers in quantities such that bulk polymer properties are not significantly affected.

Most preferably, the reactive carrier has a melting point that ensures that it is a liquid or slurry at near ambient temperatures. As used herein, the term "near ambient" includes temperatures between about 20° C. and 60° C. Near ambient temperatures simplify the unit operations necessary to introduce additives. Neither extruders nor complicated heating systems are needed to introduce the reactive carrier into the polyethylene terephthalate polymers.

As a general matter, the reactive carrier should make up no more than about one weight percent of the polyethylene terephthalate resin. Preferably, the reactive carrier is introduced to the polyethylene terephthalate polymers in quantities such that its concentration in the polymer resin is less than about 1,000 ppm (i.e., 0.1 weight percent). Reducing the reactive carrier to quantities such that its concentration in the polymer resin is less than 500 ppm (i.e., 0.05 weight percent) will further reduce potential adverse effects to bulk polymer properties.

FIGS. 1 and 2 illustrate the theoretical loss of intrinsic viscosity as a function of reactive carrier concentration at several molecular weights. FIG. 1 depicts the impact of the reactive carrier upon polyethylene terephthalate having an intrinsic viscosity of 0.63 dl/g. Similarly, FIG. 2 depicts the impact of the reactive carrier upon polyethylene terephthalate having intrinsic viscosity of 0.45 dl/g. Note that at any concentration, the reactive carriers having higher molecular weights have less adverse effect upon intrinsic viscosity of the polymer resin.

As will be understood by those of ordinary skill in the art, macromolecules are considered to be polymers at an intrinsic viscosity of about 0.45 dl/g. This roughly translates to a molecular weight of at least about 13,000 g/mol. In contrast, the reactive carriers according to the present invention have molecular weights that are less than about 10,000 g/mol. The molecular weight of the reactive carrier is typically less than 6,000 g/mol, preferably less than 4,000 g/mol, more preferably between about 300 and 2,000 g/mol, and most preferably between about 400 and 1,000 g/mol. As used herein, molecular weight refers to number-average molecular weight, rather than weight-average molecular weight.

In general, reactive carriers having carboxyl, hydroxyl, or amine functional groups are favored. Preferred are polyols, especially polyester polyols and polyether polyols, having a molecular weight that is sufficiently high such that the polyol will not substantially reduce the intrinsic viscosity of the polyethylene terephthalate polymer, and a viscosity that facilitates pumping of the polyol. Polyethylene glycol is a preferred polyol. Other exemplary polyols include functional polyethers, such as polypropylene glycol that is prepared from propylene oxide, random and block copolymers of ethylene oxide and propylene oxide, and polytetramethylene glycol that is derived from the polymerization of tetrahydrofuran.

Alternatively, the reactive carrier may include dimer or trimer acids and anhydrides. In another embodiment, the reactive carrier may possess, in addition to or in place of terminal functional groups, internal functional groups (e.g., esters, amides, and anhydrides) that react with the polyethylene terephthalate polymers. In yet another embodiment, the reactive carrier may include esters without terminal functional groups, amides without terminal functional groups, or anhydrides without terminal functional groups that are capable of reacting into the polyethylene terephthalate polymers during solid state polymerization and that will not cause the polyethylene terephthalate polymers to suffer intrinsic viscosity loss during injection molding processes.

In view of the foregoing, a preferred embodiment of the invention includes reacting terephthalic acid and ethylene glycol in a heated esterification reaction to form monomers and oligomers of terephthalic acid and ethylene glycol, then polymerizing these monomers and oligomers via melt phase polycondensation to form polyethylene terephthalate polymers. Thereafter, an additive is introduced into the polyethylene terephthalate polymers using a reactive carrier, which facilitates uniform blending within the polymer melt. Preferably, the reactive carrier is a polyol (e.g., polyethylene glycol) having a molecular weight that permits the polyol to be pumped at near ambient temperatures (i.e., less than 60° C.) and that is introduced to the polyethylene terephthalate polymers in quantities such that bulk properties of the polyethylene terephthalate polymers are not significantly affected. The polyethylene terephthalate polymers are then formed into chips (or pellets via a polymer cutter) before being solid state polymerized. Importantly, the polyol reactive carrier combines with the polyethylene terephthalate polymer such that it is non-extractable during subsequent processing operations (e.g., forming polyester beverage containers).

As noted, the invention embraces the late addition of various kinds of additives via the reactive carrier. Late addition is especially desirable where the additives are volatile or subject to thermal degradation. Conventional additive injection during the esterification stage or early during the polycondensation stage subjects additives to several hours of high-temperature (greater than 260° C.) and reduced-pressure (less than 10 torr) conditions. Consequently, additives that have significant vapor pressure at these conditions will be lost from the process. Advantageously, the method of the present invention significantly reduces the time additives are exposed to high polycondensation temperatures.

Additives according to the present invention can include preform heat-up rate enhancers, stabilizers, compatibilizers, inert particulate additives (e.g., clays or silicas), colorants, antioxidants, branching agents, oxygen barrier agents, carbon dioxide barrier agents, oxygen scavengers, crystallization control agents, acetaldehyde reducing agents, impact modifiers, catalyst deactivators, melt strength enhancers, antistatic agents, lubricants, chain extenders, nucleating agents, solvents, fillers, and plasticizers.

In view of the foregoing, those having ordinary skill in the art will recognize the effectiveness of introducing stabilizers in accordance with the present invention. In this regard, two exemplary classes of stabilizers include ultraviolet (UV) stabilizers and catalyst stabilizers.

UV stabilizers include UV radiation absorbers. As will be understood by those familiar with polymeric packaging materials, UV absorbers protect polyester packaging (e.g., containers and films) and contents of packages from UV degradation. In brief, UV absorbers absorb UV radiation and dissipate it as thermal energy. Benzotriazole (and its derivatives) and benzophenone (and its derivatives) are exemplary UV radiation absorbers.

UV stabilizers also include hindered amine compounds. Unlike UV absorbers, hindered amine compounds do not absorb light but rather retard degradation reactions caused by UV radiation. Though their specific stabilizing mechanism is complex, hindered amines generally work by slowing photochemically initiated degradation reactions. Hindered amines are typically derivatives of 2,2,6,6-tetramethyl piperidine.

Regarding catalyst stabilizers, those having ordinary skill in the art will appreciate that polymerization catalysts increase polymerization rates, and thus productivity. Unfortunately, these same catalysts will eventually degrade the thermal stability of the polymer resin. Thus, in yet another preferred embodiment, the additive carried by the reactive carrier is a catalyst stabilizer. While phosphorous-containing catalyst stabilizers are preferred, any catalyst stabilizer that will deactivate the polymerization catalyst may be introduced via a reactive carrier. In general, the catalyst stabilizer should be non-reactive with the polymer and possess low residual moisture.

As the polycondensation reaction nears completion, the catalyst begins to form acetaldehyde and cause discoloration or yellowing of the polyethylene terephthalate. Accordingly, as discussed herein, thermally stable polyester refers to polyester having low acetaldehyde content, low discoloration, and high retention of molecular weight despite exposure to high temperatures.

Acetaldehyde is an objectionable byproduct of polymer degradation. This is of particular concern to the food and beverage industry because acetaldehyde, even in minute amounts, adversely affects product taste. Moreover, polymer degradation will typically cause undesirable discoloration or yellowing. This is why a catalyst stabilizer, preferably containing phosphorous, is added to the polymer melt.

Advantageously, the late addition of the catalyst stabilizer to the polymer melt prevents the catalyst stabilizer from inhibiting ("cooling") the polymerization catalyst during the polycondensation reaction. This increases the production efficiency of the continuous polyethylene terephthalate process. Furthermore, because the catalyst stabilizer is added before polymer processing, the catalyst stabilizer can adequately prevent discoloration and degradation of the polyethylene terephthalate polyester.

Those having ordinary skill in the art will understand that acetaldehyde can be further reduced according to the present invention by introducing acetaldehyde reducing agents (i.e., acetaldehyde scavengers) in conjunction with catalyst stabilizers, such as phosphorous-containing stabilizers. For example, in accordance with the present invention, the acetaldehyde reducing agent and the catalyst stabilizer may be introduced together via reactive carrier during melt polycondensation (e.g., where the intrinsic viscosity of the polyethylene terephthalate polymers is about 0.45 dl/g or more) or after melt polycondensation stage. Moreover, in accordance with the present invention, the acetaldehyde reducing agent may be introduced via reactive carrier during melt polycondensation and the catalyst stabilizer may be introduced via reactive carrier after melt polycondensation, or vice-versa.

It should be noted that because the melting and extruding steps in the formation of the polyethylene terephthalate polyester are performed at elevated temperatures (e.g., usually greater than 260° C.), it is important that the polyethylene terephthalate be thermally stable. Accordingly, the catalyst stabilizer additive must be adequately blended with the polymer melt to deactivate polymerization catalysts. The reactive carrier facilitates the incorporation of the catalyst stabilizer into the polymer resin.

As noted, compatibilizers may be introduced to polyethylene terephthalate in accordance with the present invention. Compatibilizers are employed to make homogenous polymer blends from polymers that are, at least in some respects, incompatible. Such compatibilized polymer blends can possess unique, desirable properties and can reduce the need for expensive and time-consuming development of new polymers. Compatibilizers can also be used as polymer modifying agents to improve such properties as impact strength, tensile strength, and chemical resistance.

An exemplary use of compatibilizers is described in U.S. Pat. No. 6,339,121, which is herein incorporated by reference in its entirety. For instance, U.S. Pat. No. 6,339,121 describes blending immiscible polymers to improve the polymer blend. U.S. Pat. No. 6,339,121 specifically discloses a nanocomposite compatibilizer that is formed by combining an organoclay and an intercalation agent. As used herein, however, the term "compatibilizer" is used in its broad sense and is in no way limited to the kinds of compatibilizers described in U.S. Pat. No. 6,339,121.

Modifying polyethylene terephthalate with compatibilizers can increase its intimacy with other kinds of polymers. In this regard, compatibilized polyethylene terephthalate may be blended with other condensation polymers, such as polyamides (i.e., nylons), polyimides, polyurethanes, and polycarbonates. Compatibilizers may also be used with other polyesters, such as polytrimethylene terephthalate and polybutylene terephthalate.

In addition, compatibilized polyethylene terephthalate may be blended with addition polymers, such as olefins (e.g., high-density polyethylene (HDPE), low-density polyethylene (LDPE), linear low-density polyethylene (LLDPE), and polypropylene), chlorinated polymers (e.g., polyvinylchloride (PVC) and polyvinyl dichloride (PVDC)), and fluorinated polymers (e.g., polyvinyl fluoride (PVF) and polyvinylidene difluoride (PVDF)). Polymer blends that include compatibilized polyethylene terephthalate (i.e., prepared in accordance with the present invention) may be may be especially useful in containers, films, and engineering resins, as well as in textiles, such as fibers, yarns, and fabrics (e.g., nonwovens).

Although the prior discussion focuses upon the continuous production of polyester terephthalate polymers, it will be understood that the invention is not so limited. The teachings disclosed herein may be applied to semi-continuous processes and even batch processes.

In the specification and the drawings, typical embodiments of the invention have been disclosed. Specific terms have been used only in a generic and descriptive sense, and not for purposes of limitation. The scope of the invention is set forth in the following claims.

The invention claimed is:

1. A method for introducing additives into polyethylene terephthalate, comprising:
    polymerizing polyethylene terephthalate precursors via melt phase polycondensation to form polyethylene terephthalate polymers possessing sufficient molecular weight to facilitate polymer processing; and
    thereafter, introducing an additive into the polyethylene terephthalate polymers via a reactive carrier that has a molecular weight of between about 300 and 10,000 g/mol, the reactive carrier being a delivery vehicle for the additive;
    wherein the additive is introduced to the polyethylene terephthalate polymers in quantities such that its concentration in the polyethylene terephthalate polymers is less than about one weight percent; and
    wherein the reactive carrier is introduced to the polyethylene terephthalate polymers in quantities such that bulk properties of the polyethylene terephthalate polymers are not significantly affected.

2. A method according to claim 1, further comprising solid state polymerizing the polyethylene terephthalate polymers.

3. A method according to claim 1, further comprising forming the polyethylene terephthalate polymers into containers.

4. A method according to claim 1, further comprising forming the polyethylene terephthalate polymers into films.

5. A method according to claim 1, further comprising forming the polyethylene terephthalate polymers into fibers.

6. A method according to claim 1, wherein the step of polymerizing polyethylene terephthalate precursors comprises polymerizing polyethylene terephthalate precursors via melt phase polycondensation to form polyethylene terephthalate polymers having an intrinsic viscosity of at least about 0.45 dl/g.

7. A method according to claim 1, wherein the step of polymerizing polyethylene terephthalate precursors comprises polymerizing polyethylene terephthalate precursors via melt phase polycondensation to form polyethylene terephthalate polymers having an intrinsic viscosity of at least about 0.50 dl/g.

8. A method according to claim 1, wherein the step of polymerizing polyethylene terephthalate precursors comprises polymerizing polyethylene terephthalate precursors via melt phase polycondensation to form polyethylene terephthalate polymers having an intrinsic viscosity of at least about 0.55 dl/g.

9. A method according to claim 1, wherein the step of polymerizing polyethylene terephthalate precursors comprises polymerizing polyethylene terephthalate precursors via melt phase polycondensation to form polyethylene terephthalate polymers having an intrinsic viscosity of at least about 0.60 dl/g.

10. A method according to claim 1, wherein the additive is a catalyst stabilizer.

11. A method according to claim 1, wherein the additive is a UV stabilizer.

12. A method according to claim 11, wherein the UV stabilizer is a UV radiation absorber.

13. A method according to claim 12, wherein the UV radiation absorber comprises benzotriazole or derivatives of benzotriazole.

14. A method according to claim 12, wherein the UV radiation absorber comprises benzophenone or derivatives of benzophenone.

15. A method according to claim 11, wherein the UV stabilizer is a hindered amine compound.

16. A method according to claim 15, wherein the hindered amine compound comprises 2,2,6,6-tetramethyl piperidine or derivatives of 2,2,6,6-tetramethyl piperidine.

17. A method according to claim 1, wherein the additive is a compatibilizer.

18. A method according to claim 1, wherein the additive is selected from the group consisting of heat-up rate enhancers, inert particulate additives, colorants, antioxidants, branching agents, barrier agents, oxygen scavengers, crystallization control agents, acetaldehyde reducing agents, impact modifiers, catalyst deactivators, melt strength enhancers, antistatic agents, lubricants, chain extenders, nucleating agents, solvents, fillers, and plasticizers.

19. A method according to claim 1, wherein the additive is introduced to the polyethylene terephthalate polymers in quantities such that its concentration in the polyethylene terephthalate polymers is less than about 200 ppm.

20. A method according to claim 1, wherein the additive is introduced to the polyethylene terephthalate polymers in quantities such that its concentration in the polyethylene terephthalate polymers is between about 40 and 150 ppm.

21. A method according to claim 1, wherein the reactive carrier has a molecular weight of more than about 2,000 g/mol.

22. A method according to claim 1, wherein the reactive carrier has a molecular weight of less than about 2,000 g/mol.

23. A method according to claim 1, wherein the reactive carrier has a molecular weight of between about 400 and 1,000 g/mol.

24. A method according to claim 1, wherein the reactive carrier is a liquid or slurry at near ambient temperatures.

25. A method for introducing additives into polyethylene terephthalate, comprising:
polymerizing polyethylene terephthalate precursors via melt phase polycondensation to form polyethylene terephthalate polymers possessing sufficient molecular weight to facilitate polymer processing; and
thereafter, introducing an additive into the polyethylene terephthalate polymers via a reactive carrier that has a molecular weight of between about 300 and 10,000 g/mol, the reactive carrier being a delivery vehicle for the additive;
wherein the additive is introduced to the polyethylene terephthalate polymers in quantities such that its concentration in the polyethylene terephthalate polymers is less than about one weight percent; and
wherein the reactive carrier is introduced to the polyethylene terephthalate polymers in quantities such that its concentration in the polyethylene terephthalate polymers is less than about 1,000 ppm.

26. A method according to claim 25, wherein the additive is introduced to the polyethylene terephthalate polymers in quantities such that its concentration in the polyethylene terephthalate polymers is less than about 200 ppm.

27. A method according to claim 26, wherein the additive is a catalyst stabilizer.

28. A method according to claim 25, wherein the reactive carrier is introduced to the polyethylene terephthalate polymers in quantities such that its concentration in the polymers is less than about 500 ppm.

29. A method according to claim 28, wherein the additive is introduced to the polyethylene terephthalate polymers in quantities such that its concentration in the polyethylene terephthalate polymers is less than about 100 ppm.

30. A method according to claim 25, wherein the additive is a UV stabilizer.

31. A method according to claim 25, wherein the additive is a compatibilizer.

32. A method according to claim 25, wherein the additive is selected from the group consisting of heat-up rate enhancers, inert particulate additives, colorants, antioxidants, branching agents, barrier agents, oxygen scavengers, crystallization control agents, acetaldehyde reducing agents, impact modifiers, catalyst deactivators, melt strength enhancers, antistatic agents, lubricants, chain extenders, nucleating agents, solvents, fillers, and plasticizers.

33. A method for the late introduction of compatibilizer into polyethylene terephthalate, comprising:
reacting a terephthalate component and a diol component to form polyethylene terephthalate precursors;
polymerizing the polyethylene terephthalate precursors via melt phase polycondensation to form polyethylene terephthalate polymers; and
thereafter introducing a compatibilizer into the polyethylene terephthalate polymers via a reactive carrier having a molecular weight of less than about 10,000 g/mol, the reactive carrier being a delivery vehicle for the compatibilizer.

34. A method according to claim 33, wherein the reactive carrier has a molecular weight of more than about 300 g/mol.

35. A method according to claim 33, wherein the reactive carrier has a molecular weight of between about 400 and 1,000 g/mol.

36. A method according to claim 1, wherein:
the step of polymerizing polyethylene terephthalate precursors comprises polymerizing polyethylene terephthalate precursors via a continuous melt phase polycondensation process to form a polyester melt comprising polyethylene terephthalate polymers; and
the step of introducing an additive into the polyethylene terephthalate polymers via a reactive carrier comprises introducing an additive into the polyester melt via a reactive carrier.

37. A method according to claim 1, wherein the step of introducing an additive into the polyethylene terephthalate polymers via a reactive carrier comprises reacting the reactive carrier with the polyethylene terephthalate polymers.

38. A method according to claim 1, wherein the reactive carrier comprises internal functional groups that react with polyethylene terephthalate polymers.

39. A method according to claim 1, wherein the reactive carrier comprises an anhydride.

40. A method according to claim 1, wherein the reactive carrier is an anhydride having at least one internal functional group.

41. A method according to claim 25, wherein:
the step of polymerizing polyethylene terephthalate precursors comprises polymerizing polyethylene terephthalate precursors via a continuous melt phase polycondensation process to form a polyester melt comprising polyethylene terephthalate polymers; and
the step of introducing an additive into the polyethylene terephthalate polymers via a reactive carrier comprises introducing an additive into the polyester melt via a reactive carrier such that the reactive carrier reacts with the polyethylene terephthalate polymers.

42. A method according to claim 25, wherein the reactive carrier comprises an anhydride.

* * * * *

UNITED STATES PATENT AND TRADEMARK OFFICE
CERTIFICATE OF CORRECTION

| | | |
|---|---|---|
| PATENT NO. | : 7,759,449 B2 | Page 1 of 1 |
| APPLICATION NO. | : 10/962167 | |
| DATED | : July 20, 2010 | |
| INVENTOR(S) | : Nichols et al. | |

It is certified that error appears in the above-identified patent and that said Letters Patent is hereby corrected as shown below:

Title Page; item (56);
In the Bibliographic Data

Page 2, Column 1, Line 37 under "Foreign Patent Documents"

~~EP 0453917 A1 4/1991~~ should read EP 0459317 A1 4/1991

Page 3, Column 1, Line 22 under "Other Publications"

"U.S. ~~Appl.~~ No. 6,573,359." should read
"U.S. Patent No. 6,573,359."

Page 3, Column 2, Line 33 under "Other Publications"

"U.S. ~~Appl.~~ No. 6,573,359, issued on Jul. 4, 2005 [Re-cited with date" should read
"U.S. Patent No. 6,573,359, issued on Jul. 4, 2005 [Re-cited with date"

Signed and Sealed this
Fifteenth Day of February, 2011

David J. Kappos
*Director of the United States Patent and Trademark Office*